United States Patent [19]

Girguis et al.

[11] 4,147,041
[45] Apr. 3, 1979

[54] UNIVERSAL JOINT

[75] Inventors: Sobhy Girguis, Troisdorf-Oberlar; Werner Krude, Neunkirchen; Peter Harz, Hennef, all of Fed. Rep. of Germany

[73] Assignee: Uni-Cardan AG, Siegburg, Fed. Rep. of Germany

[21] Appl. No.: 760,369

[22] Filed: Jan. 18, 1977

[30] Foreign Application Priority Data

Apr. 28, 1976 [DE] Fed. Rep. of Germany ....... 2618536

[51] Int. Cl.² .............................................. F16D 3/26
[52] U.S. Cl. ...................... 64/17 A; 64/21; 277/92; 277/212 FB
[58] Field of Search ................ 64/21, 18, 17 A, 17 R; 277/19, 20, 72 FM, 212 FB, 92

[56] References Cited

U.S. PATENT DOCUMENTS

| 1,371,006 | 3/1921 | Thiemer | 64/18 |
|---|---|---|---|
| 1,621,216 | 3/1927 | Peters | 64/18 |
| 1,847,322 | 3/1932 | Williams | 64/18 |
| 3,029,618 | 4/1962 | Bouchard et al. | 64/21 |
| 3,362,193 | 1/1968 | Ritsema | 277/212 FB |
| 3,807,195 | 4/1974 | Faulbecker | 64/21 |
| 3,830,083 | 8/1974 | Hadick et al. | 277/212 FB |
| 3,962,889 | 7/1974 | Stillwagon | 64/17 R |

FOREIGN PATENT DOCUMENTS

| 1750604 | 2/1971 | Fed. Rep. of Germany | 277/212 FB |
|---|---|---|---|
| 1775265 | 8/1971 | Fed. Rep. of Germany | 277/212 FB |
| 2235364 | 7/1972 | Fed. Rep. of Germany | 64/17 A |
| 317990 | 8/1929 | United Kingdom | 64/17 R |

Primary Examiner—Samuel Scott
Assistant Examiner—Gerald A. Anderson
Attorney, Agent, or Firm—Edmund M. Jaskiewicz

[57] ABSTRACT

A universal joint has a single flexible elastic seal inclosing the trunnion body and in contact with the bearings on the trunnion pins to form seals therewith. The trunnion body is provided with a reservoir in the form of a depression or chamber so that the reservoir is positioned between the trunnion body and the seal. Passages may be provided between the reservoir and seal to extend toward the trunnion pins.

4 Claims, 14 Drawing Figures

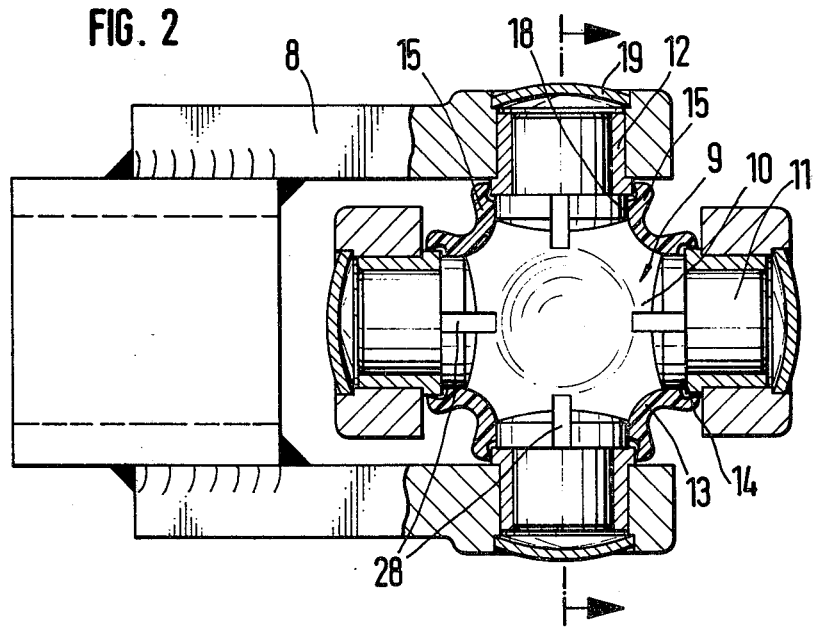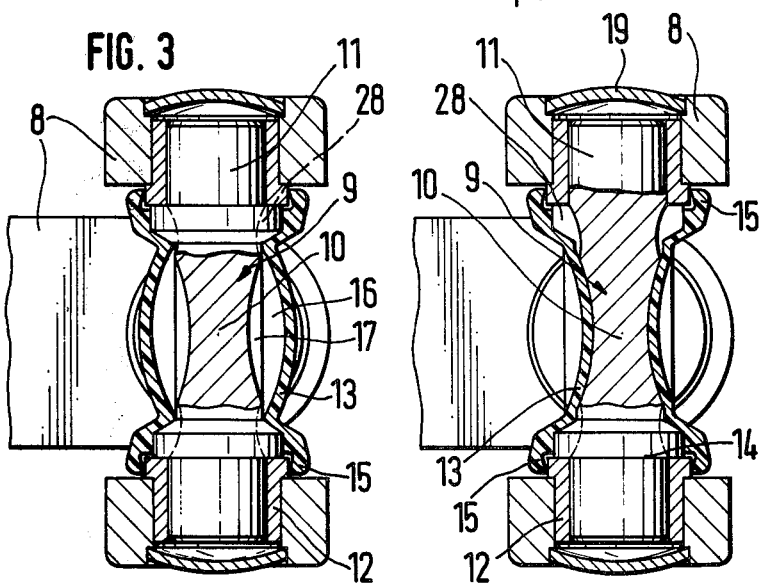

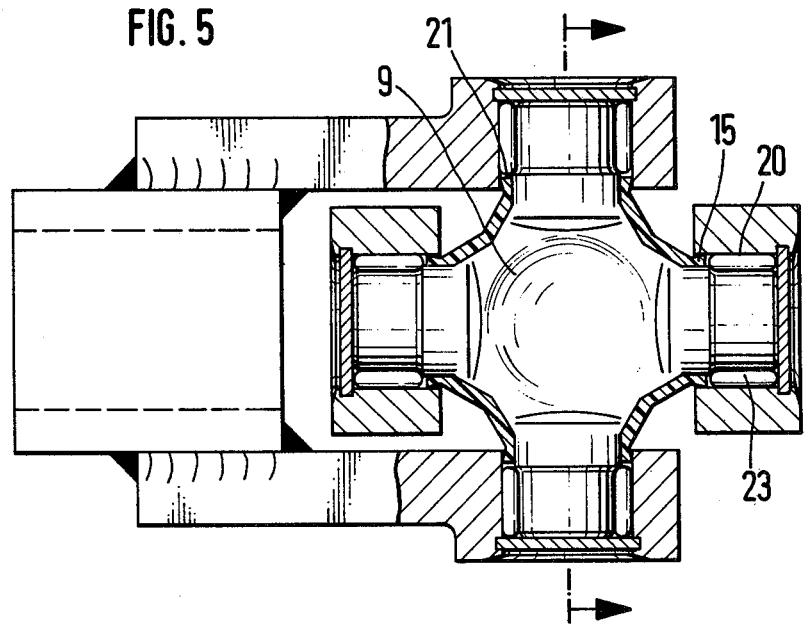
FIG. 5
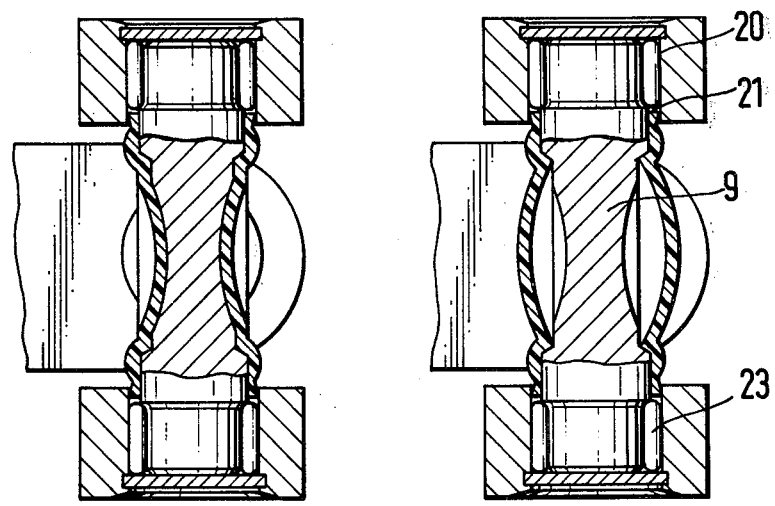
FIG. 6
FIG. 7

UNIVERSAL JOINT

The present invention relates to a universal joint having a single unbroken elastic seal enclosing the trunnion body and sealing with the bearings on the trunnion pins, more particularly, to the lubricant supply on the trunnion body.

One form of a universal joint has a cruciform trunnion from which extend a plurality of trunnion pins to interconnect with the arms of yokes. Hollow cylindrical bearings or bushings which may contain roller- or slide bearings are mounted on the trunnion pins and axially positioned in the bores of the yoke arms. A single unbroken elastic seal made of a plastics material, rubber or the like extends loosely over the body of the trunnion so as to enclose the trunnion body and also to seal against the bearing elements or bushings.

It has further been proposed to provide such a universal joint with a coating of rubber or similar material also upon the portions of the yoke arms which are pivotally connected to the trunnion. This rubber seal thus encloses the portion of the yoke arm and the trunnion body and may be glued or welded to the bearing members by a particular layer of a suitable adhesive. Such a universal joint is disclosed in the British Pat. No. 628,653. However, such a seal can be used only if the trunnion pin bearings have already been provided with suitable lubricant during the assembly of the joint. This type of a seal cover functions to prevent dust and dirt from penetrating to the interior of the universal joint but has the disadvantage that re-lubrication of the joint is not possible since this seal does not permit any lubricant to be passed out from the joint.

It has also been proposed, such as in the French Pat. No. 703,977 to provide a lubricant supply in the interior of the trunnion. The trunnion is provided with a chamber or cavity which is closed to the exterior by metal plates and a lubrication fitting as well as additional lubrication ducts must be provided in order to introduce the lubricant to various portions of the universal joint. Such a universal joint has the disadvantage that many individual components are required and the complexity of the trunnion body multiplies the manufacturing costs. As a result, such a universal joint is not economically feasible.

It is therefore the principal object of the present invention to provide an improved universal joint of the type having a flexible seal enclosing the trunnion body wherein an adequate supply of lubricant is provided so as to assure maintenance-free lubrication throughout the operating life of the joint.

It is another object of the present invention to provide such a universal joint which is simple but effective in structure and which can be economically manufactured and assembled.

According to one aspect of the present invention a universal joint may comprise a cruciform trunnion having a body portion and a plurality of trunnion pins extending from the body portion to be received in bores of yoke arms. Bearing means are provided on the trunnion pins and are axially positioned in the bores. A single flexible seal encloses the trunnion body and sealingly contacts the bearings on the trunnion pins. The trunnion body is provided with a reservoir for lubricant between the trunnion body and the enclosing seal.

Thus, according to the present invention the seal enclosing the trunnion body is formed as a contact seal with the bearings on the trunnion pins and a supply of lubricant can be accomodated between the enclosing seal and the trunnion body.

The present invention has the advantage that the seal can be varied or adapted to universal joints having different forms of bearings on the trunnion pins. Bearing elements or bushings can thus be sealed with respect to the trunnion pin. In those joints wherein roller bearings are positioned directly in the bores of the yoke arms, the yoke arms can be sealed with respect to the trunnion pin so as to eliminate the necessity of providing additional and expensive sealing rings on the separate trunnion pins.

Other objects and advantages of the present invention will be apparent upon reference to the accompanying description when taken in conjunction with the following drawings, which are examplary, wherein:

FIG. 2 is an end-elevational view of a trunnion provided with a seal according to the present invention and showing the trunnion bearings and seal in transverse section;

FIG. 3 is a side-elevational view with portions thereof in section of the universal joint of FIG. 2 and showing the lubrication reservoir;

FIG. 4 is a view similar to that of FIG. 3 but illustrating the reservoir either prior to introduction of the lubricant or after lubricant has been drained therefrom;

Figure 8:
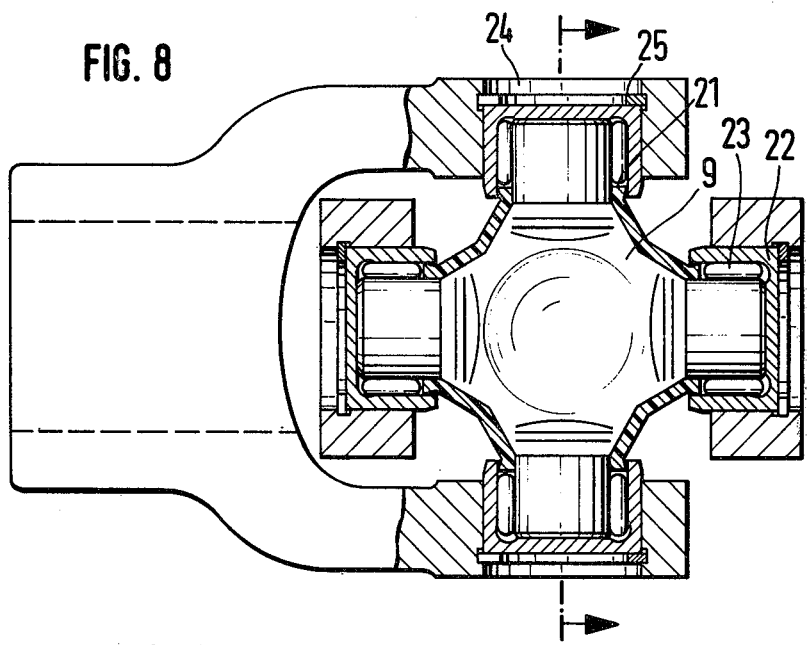
Figures 9, 10:
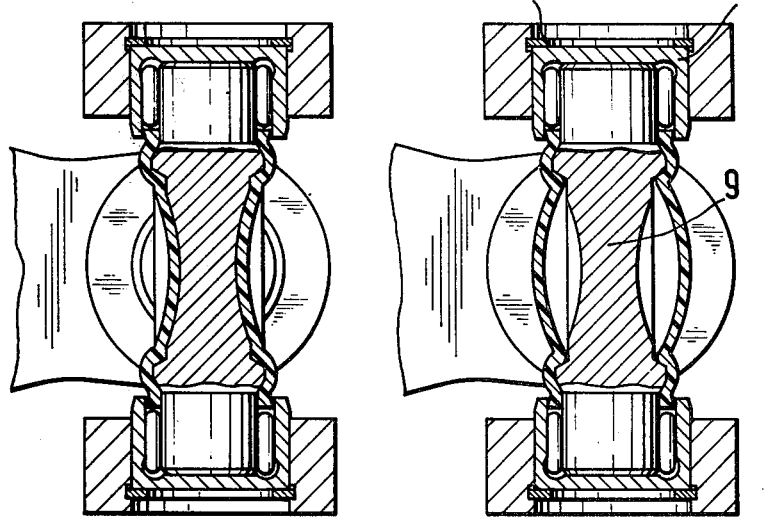
Figure 11:
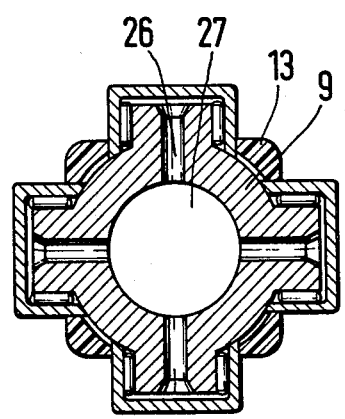
Figure 12:
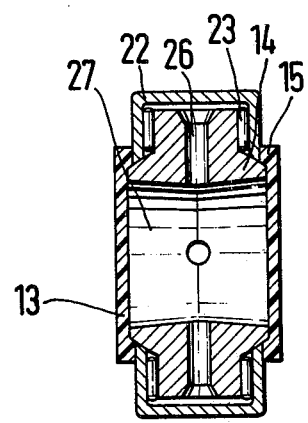
Figure 13:
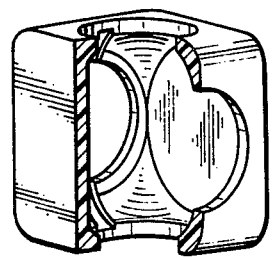
Figure 14:
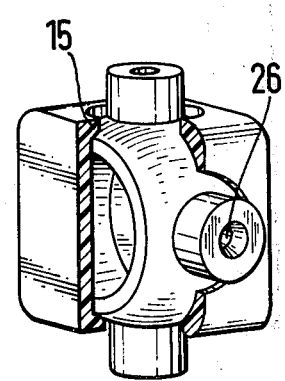

FIGS. 5–7 correspond respectively to FIGS. 2–4 but showing the trunnion being provided with roller bearings on the trunnion pins;

FIGS. 8–10 also correspond to FIGS. 2–4 but show the trunnion provided with bearing bushings and roller bearings;

FIGS. 11–14 are various views of a trunnion body provided with a lubrication chamber and lubricant bores leading therefrom having an enclosing seal as shown in FIGS. 2–4.

Proceeding next to the drawings wherein like reference symbols indicate the same parts throughout the various views a specific embodiment and modifications of the present invention will be described in detail.

Figure 1:
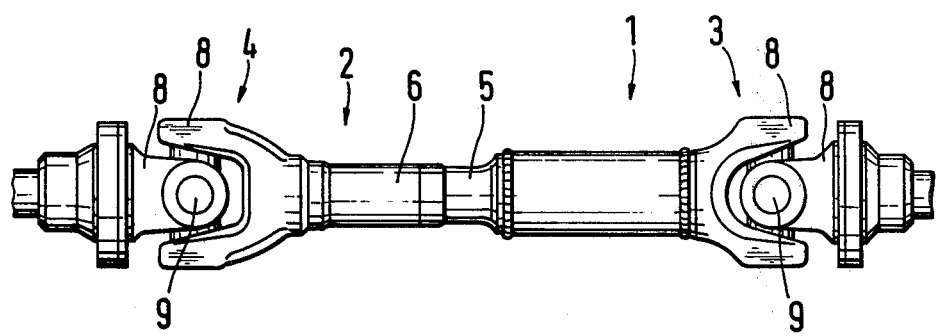
FIG. 1 is an elevational view of a cardan shaft having universal joints at both ends thereof.

In FIG. 1 there is shown a cardan shaft having two coaxial shaft portions 1 and 2 the outer ends of which are provided with universal joints 3 and 4. Each universal joint has a number of yoke arms 8 which are provided with bores to receive the ends of trunnions 9. The inner end of shaft portion 1 is solid at 5 and the inner end of shaft portion 2 is hollow at 6 and these portions are slidably but non-rotatably inter-engaged by meshing longitudinally extending splines which may be V-shaped.

As may be further seen in FIGS. 2–4 the trunnion 9 comprises a body portion 10 from which extend four equidistantly spaced trunnion pins 11. The pins 11 are provided with friction bearing bushings 12 for mounting in the bores of the yoke arms 8 of the respective shaft portions 1 and 2. A single unbroken flexible elastic seal 13 encloses the trunnion body and seals the trunnion pins 11 with respect to the yoke arms 8. The seal 13 is formed of rubber or a rubber-like material which may be natural or synthetic rubber having the characteristics of flexibility and elasticity.

The seal 13 is not adhesively secured to the body portion 10 of the trunnion and extends up to shoulders 14 which are at the bottoms of the respective trunnion pins 11. The seal 13 can be lifted or raised outwardly from the surface of the body portion 10 so that prior to assembling of the trunnion 9 in the cardan shaft 1, 2 lubricant can be forced between the trunnion pins 11 and the terminal beads 15 of the seal 13 past the shoulders 14 to the area of the body portion 10. By stretching or expanding the seal 13 a reservoir 16 can be formed between the trunnion body 10 and the seal 13 as may be seen in FIG. 3. This reservoir 16 can be further enlarged by suitably shaped recesses or depression 17 so as to be able to retain a predetermined quantity of lubricant.

The flexible seal 13 will constantly apply a pressure to the lubricant in the reservoir 16 to cause the lubricant to flow continuously through the grooves 28 toward the trunnion pins which are to be lubricated.

In a known manner, end caps 14 are provided in the yoke arm bores to seal these bores.

In the trunnion shown in FIGS. 5-7, a needle bearing 20 comprising a plurality of individual roller bearings 23 is employed between the trunnion pin and the surface of the bore in the yoke arm instead of the bushings of FIGS. 2-4. The terminal beads 15 have end surfaces 21 which contact the lower ends of the roller bearings 23 so as to position the roller bearings axially within the bores.

In. FIGS. 8-10, the trunnion 9 is provided with bearing bushings 22 which are positioned axially in the bores 24 of the yoke arms 8 by resilient split locking rings 25 seated in annular depressions formed in the bores. Roller bearings 23 are also provided between the surface of trunnion pins 11 and the bushing 22. The roller bearings 23 are also supported by the end faces 21 on the seal 13.

It is not necessary to provide any of the trunnions shown in FIGS. 2-10 with lubricant bores or passages in the trunnion pins 11 in order to supply the bearings 12 and 20 with lubricant. Perfect lubrication will be provided by the grooves 28 shown in FIGS. 2-4 which will permit a continuous flow of lubricant.

Initially, the lubricant is forced by pressure or insufflation into the reservoir 16 from the exterior of the seal past a trunnion shoulder 14.

In FIGS. 11-14 the trunnion 9 is provided with an inner chamber or cavity 27 to function as the lubricant reservoir. A plurality of grease bores 26 extend axially from the cavity 27 through each of the trunnion pins 11 to provide a proper supply of lubricant to the bearings surrounding the trunnion pins. The terminal beads 15 of the seal 13 will provide a seal for the bearing bushing 22 and the bushing 22 as well as the roller bearings 23 are supported on the shoulders 14 of the trunnion 9. Proper lubrication of the trunnion pins is provided by centrifugal force during operation of the universal joint which pushes the lubricant radially outwardly through the passages 26. In addition to this lubrication by centrifugal force, the enclosing seal 13 may be prestressed in the region of the openings of the reservoir 27 so as to impart an additional pressure to the lubricant therein to assist in forcing the lubricant outwardly through the passages 26 to the trunnion pins.

The seal 13 can be produced either by immersing the trunnion in a liquid plastic material or by spray-coating the trunnion with a layer of the seal material. Since the seal is not securely attached to the surface of the trunnion body the seal can be readily lifted up or raised from the body of the trunnion to provide for the introduction of lubricant between the trunnion and the seal. The deposition of the lubricant between the surface of the trunnion body and the seal will form an adequate lubricant reservoir.

By providing an additional lubricant chamber in the trunnion, the chamber together with the seal will be able to accomodate a large quantity of lubricant in order to assure proper lubrication of the universal joint during operation.

Thus it can be seen that a universal joint whose trunnion is enclosed with a resilient rubber-like seal can be provided with adequate and proper lubrication by a lubricant reservoir between the trunnion body and the seal as disclosed herein.

It will be understood that this invention is susceptible to modification in order to adapt it to different usages and conditions, and accordingly, it is desired to comprehend such modifications within this invention as may fall within the scope of appended claims.

What is claimed is:

1. A universal joint comprising a cruciform trunnion having a body portion and a surface thereon, a plurality of trunnion pins extending from said body portion and received in bores of yoke arms, there being grooves in said surface to said trunnion pins, bearing means on said trunnion pins axially positioned in said bores, a single flexible seal enclosing the surface of said trunnion body and sealingly contacting said bearing means, said seal being liftable from the surface of said trunnion body to define a reservoir for lubricant between said trunnion body surface and said seal such that the flexible seal constantly applies a pressure to the lubricant in the reservoir to cause the lubricant to flow continuously through said grooves toward the trunnion pins.

2. A universal joint as claimed in claim 1 wherein there are grooves on said trunnion body extending from said reservoir toward said trunnion pins.

3. A universal joint as claimed in claim 1 wherein there is a depression in a surface of said trunnion body.

4. A universal joint as claimed in claim 1 wherein there is a chamber within said trunnion body.

* * * * *